US012455955B2

(12) United States Patent
Lu et al.

(10) Patent No.: US 12,455,955 B2
(45) Date of Patent: Oct. 28, 2025

(54) METHOD FOR IMPLEMENTING DONGLE, AND DONGLE (71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 151 days.

(21) Appl. No.: 18/010,937

(22) PCT Filed: Oct. 27, 2021

(86) PCT No.: PCT/CN2021/126648
§ 371 (c)(1),
(2) Date: Dec. 16, 2022

(87) PCT Pub. No.: WO2022/116747
PCT Pub. Date: Jun. 9, 2022

(65) Prior Publication Data
US 2023/0289428 A1   Sep. 14, 2023

(30) Foreign Application Priority Data
Dec. 3, 2020 (CN) .......................... 202011392190.8

(51) Int. Cl.
G06F 21/44 (2013.01)
(52) U.S. Cl.
CPC .................................. G06F 21/44 (2013.01)
(58) Field of Classification Search
CPC .......... G06F 21/44; G06F 21/34; G06F 21/78; G06F 21/79; G06F 21/77
See application file for complete search history.

(56) References Cited

U.S. PATENT DOCUMENTS 5,974,517 A * 10/1999 Gaudet ................. G06F 3/0626
713/1
2014/0348326 A1* 11/2014 Meyer ..................... H04L 9/008
380/255

(Continued)

Primary Examiner — Taghi T Arani
Assistant Examiner — Blake I Narramore
(74) Attorney, Agent, or Firm — J. Clinton Wimbish; Maynard Nexsen PC (57) ABSTRACT A method for implementing a dongle, comprising: a security chip of a dongle determining whether a secure digital (SD) card in a card slot of the dongle is a valid SD card; if the SD card is a valid SD card, when a received instruction is a first/second USB flash drive area access instruction sent by a system, executing an operation of accessing the first/second USB flash drive area; when the received instruction is a PIN code verification instruction for the second USB flash drive area or an encryption area sent by an upper layer, executing a PIN code verification operation on the second USB flash drive area or the encryption area; when the received instruction is a read/write instruction for the encryption area sent by the upper layer, executing a read/write operation on the encryption area; if the SD card is an invalid SD card, when the received instruction is a partitioning instruction, the security chip of the dongle executing a partitioning operation according to a partition information table in the partitioning instruction, storing the partition information table to a secure storage area of the security chip of the dongle, and setting the SD card to be valid. The present invention can ensure that data stored in an SD card is not prone to damage or stealing.

20 Claims, 4 Drawing Sheets (56) References Cited

U.S. PATENT DOCUMENTS

| | | | |
|---|---|---|---|
| 2016/0098876 A1* | 4/2016 | Oz | G07C 5/008 |
| | | | 340/5.61 |
| 2018/0330120 A1 | 11/2018 | Ray et al. | |
| 2019/0026468 A1* | 1/2019 | Minamikawa | H04L 9/0866 |
| 2020/0089420 A1* | 3/2020 | Sharoni | G06F 21/79 |
| 2020/0250348 A1* | 8/2020 | Hamlin | G06F 21/34 |
| 2021/0011984 A1* | 1/2021 | Renke | G06F 21/79 |
| 2022/0083394 A1* | 3/2022 | Noverraz | G06F 8/41 |
| 2022/0129592 A1* | 4/2022 | Keshtkarjahromi | G06F 3/0658 |

* cited by examiner

METHOD FOR IMPLEMENTING DONGLE, AND DONGLE

FIELD OF THE INVENTION

The present invention relates to a method for realizing a dongle and a dongle therefor. The present application belongs to information security field.

BACKGROUND

In prior art, a dongle with mass storage function is realized by wielding a flash chip on a hardware of the dongle, which has the following disadvantages:
1) capacity of the flash chip cannot be modified freely;
2) when a flash chip has issues, the flash chip cannot be replaced; and
3) controlling the flash chip has nothing to do with the dongle, therefore, operating the flash chip is not controlled by the dongle which caused that the data on the flash chip of the dongle is easily to be destroyed and stolen.

SUMMARY OF THE INVENTION

The object of the present invention is to provide a method for realizing a dongle and a dongle therefor, which can assure security of the data on a security digital disk and prevent the data from being destroyed or stolen.

According one aspect of the present invention, there is provided a method for realizing a dongle, which comprises the following steps:
Step 1, the dongle is powered on;
Step 2, a security chip of a dongle determines whether a SD card in a slot of the dongle is a legitimate SD card, if yes, execute Step 3, if no, execute Step 3';
Step 3, the security chip of the dongle claims itself as a first U disk device and a dongle device and sends a first logic partition identification corresponding to the first U disk partition and a second logic partition identification corresponding to a second U disk partition to an operating system;
Step 4, the security chip of the dongle waits for receiving an instruction;
Step 5, the security chip of the dongle receives an instruction, when the received instruction is an instruction for accessing the first U disk partition/the second U disk partition sent from the operating system, executing Step A1; when the received instruction is an instruction for verifying PIN code of the second U disk partition sent from an upper layer, execute Step B1; when the received instruction is an instruction for verifying a PIN code of encrypted partition sent from the upper layer, execute Step C1; when the received instruction is a read/write instruction for the encrypted partition sent from the upper layer, execute Step D1;
Step A1, the security chip of the dongle accesses the first U disk partition/the second U disk partition according to the first logic partition identification/the second logic partition identification, algorithm and key corresponding to the first U disk partition/the second U disk partition in a partition information table in the instruction for accessing the first U disk partition/the second U disk partition, then go back to Step 4;
Step B1, the security chip of the dongle determines whether a PIN code in the instruction for verifying PIN code of the second U disk partition is identical to the PIN code corresponding to the second U disk partition in the partition information table, if yes, execute Step B2, if no, report an error and go back to Step 4;
Step B2, the security chip of the dongle claims itself as a second U disk device, sets permission limit of the second U disk partition to be that reading and writing is permitted, then goes back to Step 4;
Step C1, the security chip of the dongle determines whether a PIN code in the instruction for verifying PIN code of encrypted partition is identical to the PIN code corresponding to the encrypted partition in the partition information table, if yes, execute Step C2, if no, report an error, then go back to Step 4;
Step C2, the security chip of the dongle sets permission limit of the encrypted partition to be that reading and writing is permitted, then goes back to Step 4;
Step D1, the security chip of the dongle determines whether permission limit of the encrypted partition is that reading and writing is permitted, if yes, execute Step D2, if no, report an error, then goes back to Step 4;
Step D2, the security chip of the dongle performs reading or writing operation on the data of the encrypted partition according to the read/write instruction for the encrypted partition and the algorithm and the key corresponding to the encrypted partition in the partition information table, then goes back to Step 4;
Step 3', the security chip of the dongle claims itself as a massive storage device and a dongle device;
Step 4', the security chip of the dongle waits for receiving an instruction;
Step 5', the security chip of the dongle receives the instruction, when the received instruction is a partitioning instruction, execute Step A1';
Step A1', the security chip of the dongle partitions the SD card into a first U disk partition, a second U disk partition and an encrypted partition according to partition type, partition size and start position in a partition information table in the partitioning instruction, stores the partition information table into a secure storage partition of the security chip of the dongle and sets the SD card to be legitimate, then execute Step 3.

According to another aspect of the present invention, there is provided a dongle, which includes a security chip of the dongle; the security chip of the dongle includes:
a powering on module configured for powering on;
a first determining module configured to determine whether a SD card in a card slot of the dongle is a legitimate SD card, if yes, trigger a claiming and sending module, if no, trigger a claiming module;
the claiming and sending module configured to claim that the security chip of the dongle is a first U disk device and a dongle device, send a first logic partition identification corresponding to the first U disk partition and a second logic partition identification corresponding to a second U disk partition to an operating system and trigger a waiting and receiving module;
the waiting and receiving module configured to wait for receiving an instruction;
a receiving module configured to receive an instruction;
an accessing module configured to, when the instruction received by the receiving module is an instruction for accessing the first U disk partition/the second U disk partition sent from the operating system, access the first U disk partition/the second U disk partition according to the first logic partition identification/the second logic partition identification in the instruction for accessing the first U disk partition/the second U disk partition, algorithm and key corresponding to the first U disk partition/the second U disk partition in a partition information table and trigger the waiting and receiving module;

a second determining module configured to, when the instruction received by the receiving module is an instruction for verifying a PIN code of the second U disk partition sent from an upper layer, determine whether a PIN code in the instruction for verifying a PIN code of the second U disk partition is identical to the PIN code corresponding to the second U disk partition in the partition information table, if yes, trigger a claiming and setting module, if no, trigger an error reporting module;

the claiming and setting module configured to claim the security chip as a second U disk device, set a permission limit of the second U disk partition to be that reading and writing is permitted and trigger the waiting and receiving module;

the error reporting module configured to report an error and trigger the waiting and receiving module;

a third determining module configured to determine whether a PIN code in the instruction for verifying PIN code of encrypted partition is identical to the PIN code corresponding to the encrypted partition in the partition information table, if yes, trigger a setting module, if no, trigger the error reporting module;

the setting module configured to set permission limit of the encrypted partition to be that reading and writing is permitted, and trigger the waiting and receiving module;

a fourth determining module configured to determine whether permission limit of the encrypted partition is that reading and writing is permitted, if yes, trigger the reading and writing module, if no, trigger the error reporting module;

a reading and writing module configured to perform reading or writing operation on the data of the encrypted partition according to a read/write instruction for the encrypted partition and the algorithm and the key corresponding to the encrypted partition in the partition information table, and trigger the waiting and receiving module;

the claiming module configured to claim the security chip of the dongle as a massive storage device and a dongle device;

a partitioning and setting module configured to, when the instruction received by the receiving module is a partitioning instruction, partition the SD card into a first U disk partition, a second U disk partition and an encrypted partition according to a partition type, a partition size and a start position in a partition information table in the partitioning instruction, store the partition information table into a secure storage partition of the security chip of the dongle, set the SD card to be legitimate, and trigger the claiming and sending module.

The present invention provides a method for realizing a dongle and the dongle therefor. A function of massive storage in the dongle is realized by a digital memory card. Storage capacity of digital memory card can be flexible via secure digital memory cards with different capacities. By a loaded COS chip of dongle, the dongle can perform many kinds of operations on the secure digital memory card, which assures security of the data stored in the secure digital memory card, and prevents the data of the secure digital memory card from being destroyed or stolen.

According to the present invention, the capacity of a flash chip can be replaced freely; which means that the flash chip can be replaced when a flash chip has issues; controlling the flash chip is related to the dongle, operation on the flash chip is controlled by the dongle, therefore, the data of the flash chip of the dongle is not easily to be destroyed and stolen.

DESCRIPTION OF EMBODIMENTS

In the following, clear and complete description will be made on technical solutions in embodiments of the present disclosure in connection with the drawings of the present disclosure. Obviously, the described embodiments are only part of embodiments of the present disclosure, but not all the embodiments. All other embodiments obtained by those skilled in the art based on the embodiments in the present disclosure without creative work fall in the scope of protection of the present disclosure.

Embodiment 1

Figure 1:
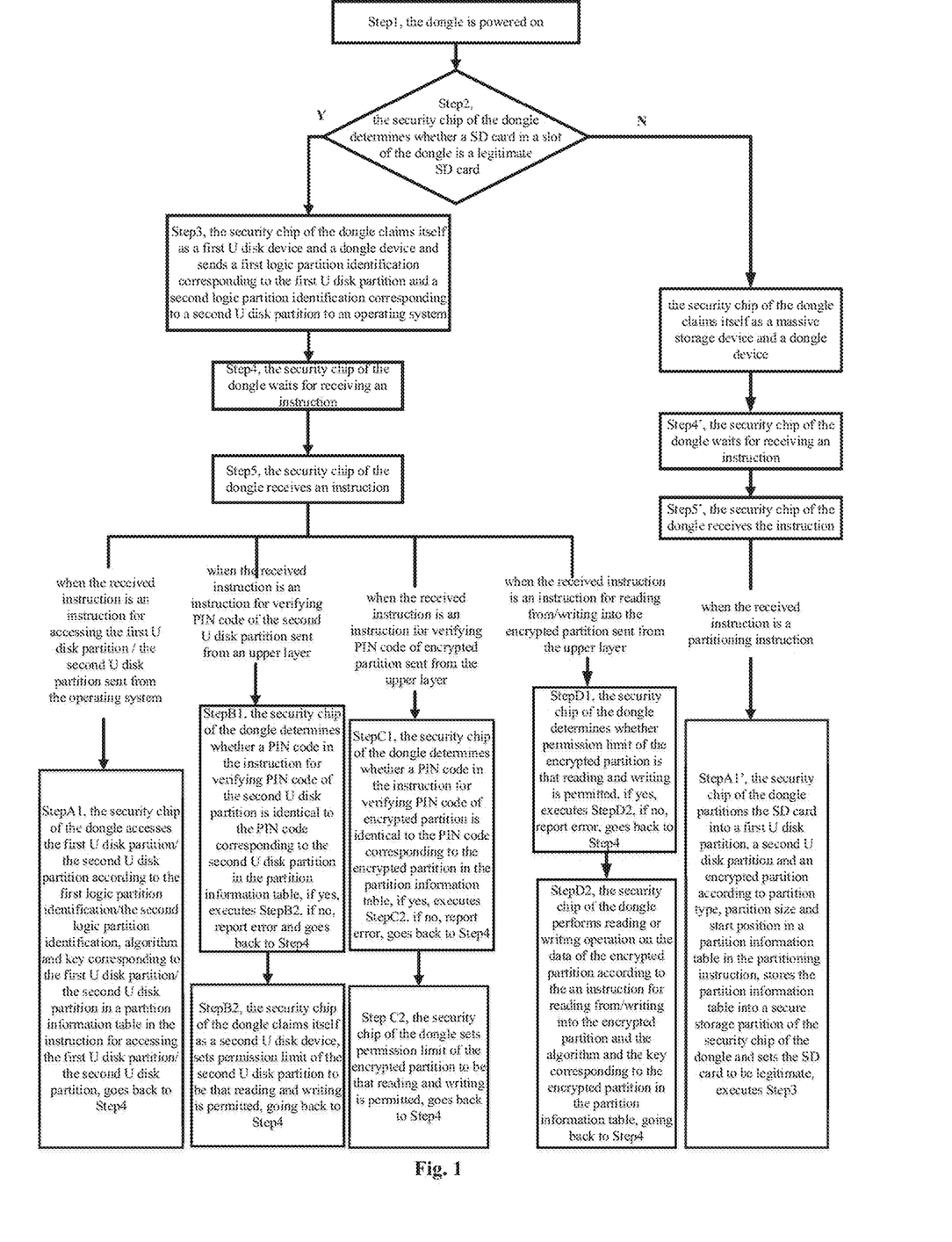
FIG. 1 is a flow chart of a method for realizing a dongle provided in Embodiment 1 of the present invention.

Embodiment 1 provides a method for realizing a dongle. As shown in FIG. 1, the method includes the following steps:

Step 1, the dongle is powered on;

Step 2, a security chip of the dongle determines whether a SD card in a slot of the dongle is a legitimate SD card, if yes, execute Step 3, if no, execute Step 3';

Step 3, the security chip of the dongle claims itself as a first U disk device and a dongle device and sends a first logic partition identification corresponding to the first U disk partition and a second logic partition identification corresponding to a second U disk partition to an operating system;

Step 4, the security chip of the dongle waits for receiving an instruction;

Step 5, the security chip of the dongle receives an instruction, when the received instruction is an instruction for accessing the first U disk partition/the second U disk partition sent from the operating system, executing Step A1; when the received instruction is an instruction for verifying a PIN code of the second U disk partition sent from an upper layer, execute Step B1; when the received instruction is an instruction for verifying a PIN code of encrypted partition sent from the upper layer, execute Step C1; when the instruction received is a read/write instruction for the encrypted partition sent from the upper layer, execute Step D1;

Step A1, the security chip of the dongle accesses the first U disk partition/the second U disk partition according to the first logic partition identification/the second logic partition identification, algorithm and key corresponding to the first U disk partition/the second U disk partition in a partition information table in the instruction for accessing the first U disk partition/the second U disk partition, then goes back to Step 4;

Step B1, the security chip of the dongle determines whether a PIN code in the instruction for verifying PIN code of the second U disk partition is identical to the PIN code corresponding to the second U disk partition in the partition information table, if yes, execute Step B2, if no, report error and go back to Step 4;

Step B2, the security chip of the dongle claims itself as a second U disk device, sets permission limit of the second U disk partition to be that reading and writing is permitted, going back to Step 4;

Step C1, the security chip of the dongle determines whether a PIN code in the instruction for verifying PIN code of encrypted partition is identical to the PIN code corresponding to the encrypted partition in the partition information table, if yes, execute Step C2, if no, report error, then go back to Step 4;

Step C2, the security chip of the dongle sets a permission limit of the encrypted partition to be that reading and writing is permitted, then goes back to Step 4;

Step D1, the security chip of the dongle determines whether a permission limit of the encrypted partition is that reading and writing is permitted, if yes, execute Step D2, if no, report an error, go back to Step 4;

Step D2, the security chip of the dongle performs reading or writing operation on the data of the encrypted partition according to the read/write instruction for the encrypted partition and the algorithm and the key corresponding to the encrypted partition in the partition information table, then goes back to Step 4;

Step 3', the security chip of the dongle claims itself as a massive storage device and a dongle device;

Step 4', the security chip of the dongle waits for receiving an instruction;

Step 5', the security chip of the dongle receives the instruction, when the received instruction is a partitioning instruction, execute Step A1';

Step A1', the security chip of the dongle partitions the SD card into a first U disk partition, a second U disk partition and an encrypted partition according to partition type, partition size and start position in a partition information table in the partitioning instruction, stores the partition information table into a secure storage partition of the security chip of the dongle and sets the SD card to be legitimate, then executes Step 3.

In Embodiment 1, Step 3 specifically is that the security chip of the dongle claims itself as a compact disk, a first U disk device and a dongle device, sends a first logic partition identification corresponding to the first U disk device, a second logic partition identification corresponding to the second U disk device, and a third logic partition identification corresponding to the compact disk to the operating system;

Step 5 further comprises that when the instruction received is a read/write instruction for compact disk sent from the operating system, executing Step E1;

Step E1, the security chip of the dongle performs reading or writing operation on the compact disk according to the third logic partition identification in the read/write instruction for compact disk.

In Embodiment 1, the instruction for accessing the first U disk partition/the second U disk partition is a read instruction sent from the operating system, Step A1 specifically is: the security chip of the dongle reads data from the first U disk partition/the second U disk partition according to an address and length in the read instruction, decrypting the read data by using the algorithm and the key corresponding to the first U disk partition/the second U disk partition in the partition information table so as to obtain decrypted data, and sending the decrypted data to the operating system, then goes back to Step 4.

In Embodiment 1, the instruction for accessing the first U disk partition/the second U disk partition is a write instruction sent from the operating system, Step A1 specifically is: the security chip of the dongle encrypts the data to be written in the write instruction by using the algorithm and the key corresponding to the first U disk partition/the second U disk partition in the partition information table to obtain encrypted data, writes the encrypted data into the first U disk partition/the second U disk partition according to a write address in the writing instruction, then goes back to Step 4.

In Embodiment 1, Step 2 specifically is: the security chip of the dongle generates SD card verifying information according to partition type, partition size and start position in a partition information table stored in a secure storage partition of the security chip of the dongle, reads binding information of the SD card and determines whether the SD card verifying information is identical to the SD card binding information stored in the SD card, if yes, execute Step 3; if no, executes Step 3';

setting the SD card to be legitimate in Step A1' specifically is: the security chip of the dongle generates SD card binding information according to the partition type, the partition size and the start position in the partition information table, and stores the binding information into the SD card.

In Embodiment 1, Step 4' specifically is that the security chip of the dongle waits for receiving an instruction, when the received instruction is a partitioning instruction sent from an upper layer, execute Step B1'; when the received instruction is an instruction for binding SD card sent from the upper layer, executes Step C1'.

Step B1', the security chip of the dongle partitions the SD card into a first U disk partition, a second U disk partition and an encrypted partition according to a partition type, a partition size and a start position in the partition information table in the partitioning instruction, stores the partition information table into a secure storage partition of the security chip of the dongle, execute Step 4'.

Step C1', the security chip of the dongle generates a random number, generates SD card binding information according to the random number and a product sequence number of the dongle, stores the SD card binding information into the secure storage partition of the security chip of the dongle and the SD card, respectively, and sets the SD card to be legitimate, then executes Step 3.

In Embodiment 1, Step 4' specifically is: the security chip of the dongle waits for receiving an instruction, when the received instruction is a partitioning instruction sent from the upper layer, execute Step B1'; when the received instruction is an SD card binding instruction sent from the upper layer, executes Step c1';

Step B1', the security chip of the dongle partitions the SD card into a first U disk partition, a second U disk partition and an encrypted partition according to a partition type, a partition size and a start position in the partition information table in the partitioning instruction, stores the partition information table into the secure storage partition of the security chip of the dongle, then executes Step 4';

Step c1', the security chip of the dongle generates SD card binding information according to binding time and the product sequence number of the dongle in the instruction for binding SD card, stores the SD card binding information into a secure storage partition of the security chip and the SD card respectively, and sets the SD card to be legitimate, then executes Step 3.

In Embodiment 1, Step 2 specifically is that the security chip of the dongle reads the SD card binding information stored in its secure storage partition and the SD card binding information stored in the SD card, determines whether they are identical, if yes, executes Step 3, if no, executes Step 3'.

In Embodiment 1, before Step 2, the method further includes that the security chip of the dongle determines whether a SD card exists in a card slot of the dongle, if yes, execute Step 2, if no, the security chip of the dongle claims itself as a standard dongle device and waits for receiving an instruction, if the instruction is an instruction for dongle, performs operation of the instruction for dongle, if the instruction is not an instruction for dongle, reports an error.

In Embodiment 5, Step 5 further includes that, when the instruction received is an instruction for clearing security status of the second U disk partition sent from the upper layer, executes Step F1, Step F1, the security chip of the dongle claims to the operating system that the second U disk is removed already and sets reading and writing permission limit of the second U disk partition to be that reading and writing is not permitted, then goes back to Step 4;

when the instruction received is an instruction for clearing a PIN code of the encrypted partition sent from the upper layer, executes Step G1, Step G1, the security chip of the dongle sets a reading and writing permission limit of the encrypted partition to be that reading and writing is not permitted, then goes back to Step 4.

Embodiment 2

Figure 2:
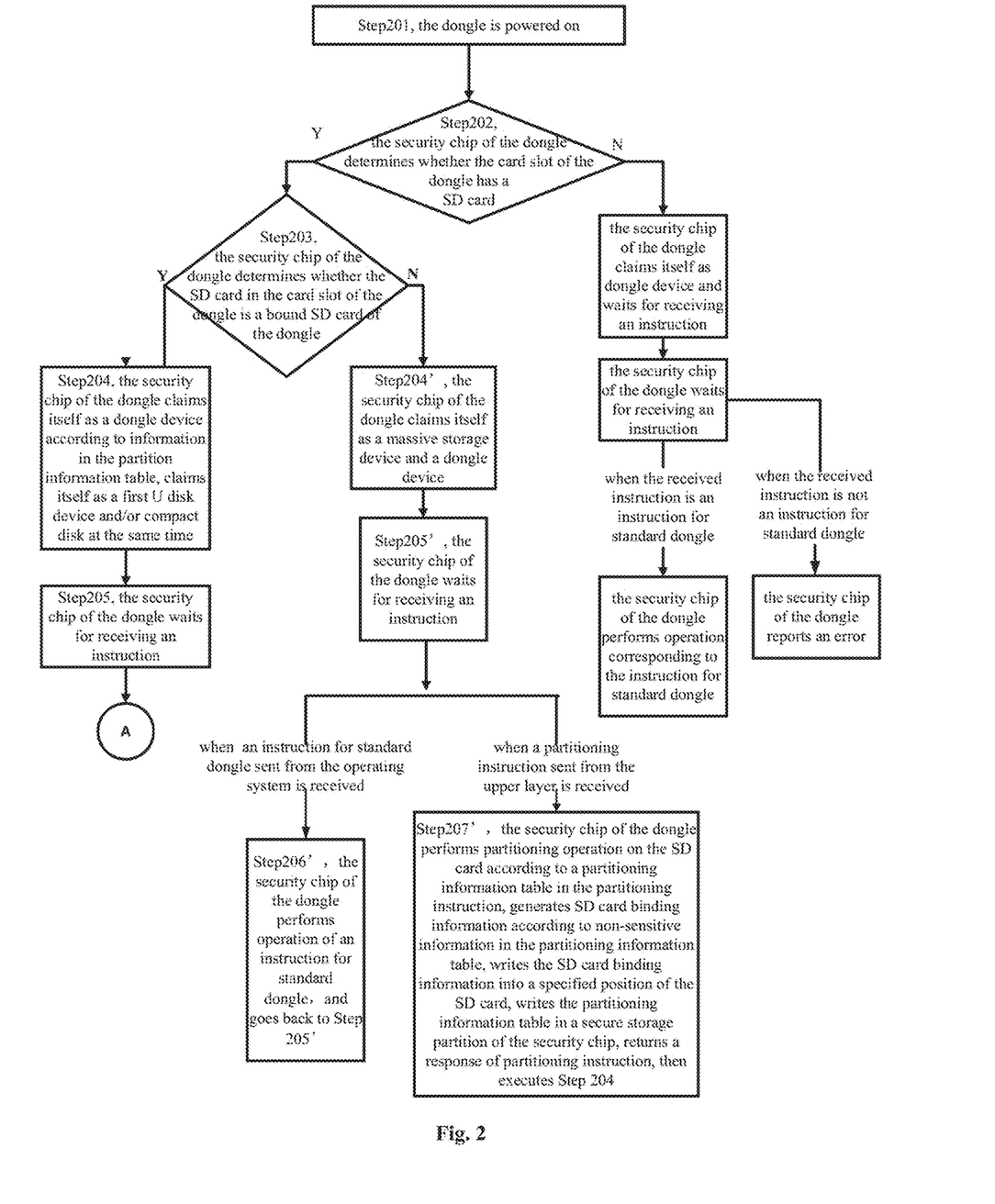
FIG. 2 and FIG. 3 present a flow chart of a method for realizing a dongle provided in Embodiment 2 of the present invention.
Figure 3:
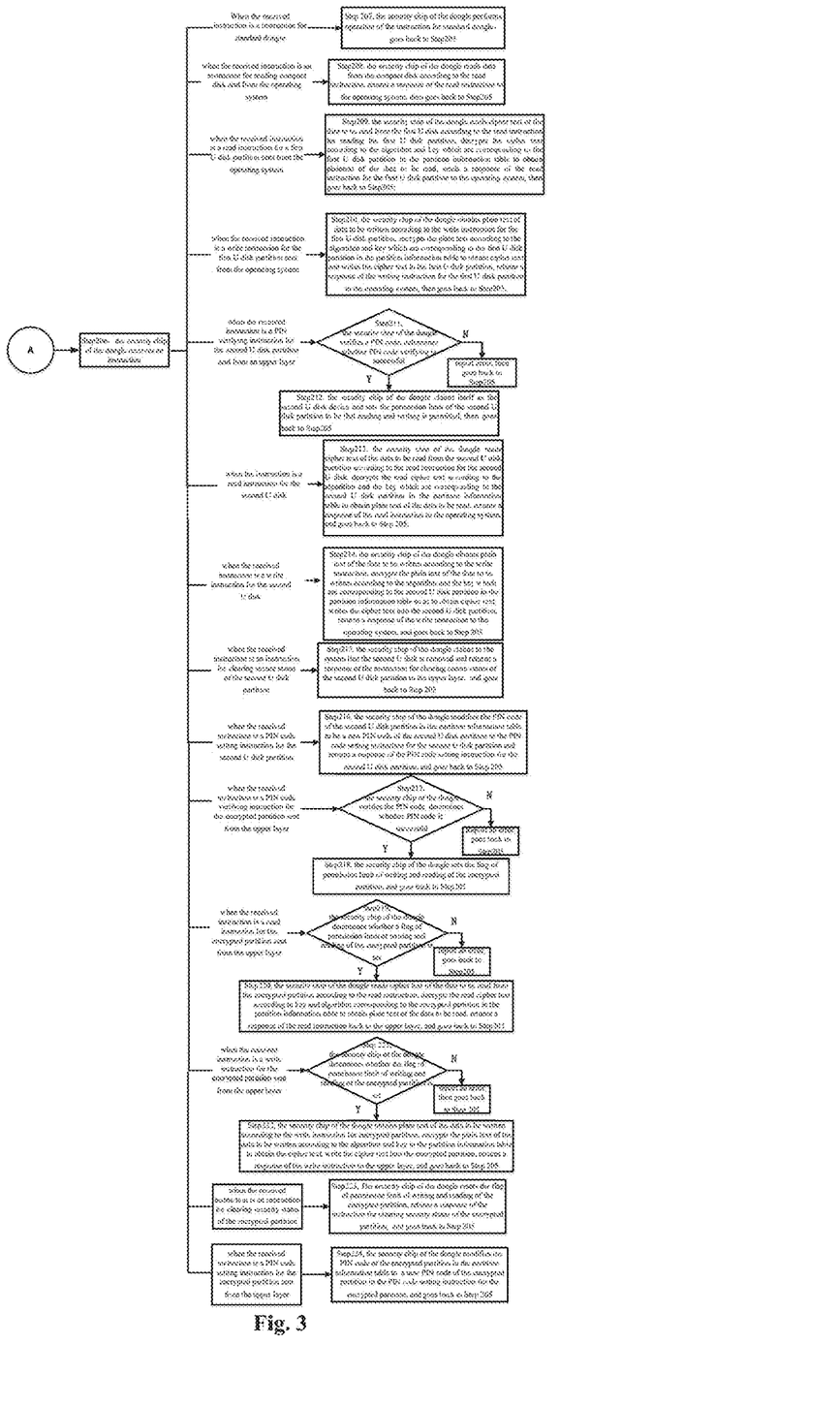

Embodiment 2 provides a method for realizing a dongle, as shown in FIG. 2 and FIG. 3, the method includes the following steps:

Step 201, the dongle is powered on;

In Embodiment 2, the dongle includes a security chip of the dongle and a card slot for secure digital memory card. The secure digital memory card briefly is called SD card.

Step 202, the security chip of the dongle determines whether the card slot of the dongle has a SD card, if yes, executes Step 203; if no, the security chip of the dongle claims itself as dongle device and the security chip of the dongle waits for receiving an instruction, when the received instruction is an instruction for standard dongle, the security chip of the dongle performs operation corresponding to the instruction for standard dongle; when the received instruction is not an instruction for standard dongle, the security chip of the dongle reports an error.

Step 203, the security chip of the dongle determines whether the SD card in the card slot of the dongle is a bound SD card of the dongle, if yes, execute Step 204, if no, execute Step 204'.

Step 203 specifically is that the security chip of the dongle reads a partition information table stored in the secure storage partition of the security chip of the dongle, performs hash operation on a partition type, a partition size and a start position which are in the partition information table to obtain a hash value, compares the hash value with read binding information stored in the SD card and determines whether they are identical, if yes, execute Step 204, if no, execute Step 204'.

Step 203 further specifically can be that the security chip of the dongle reads the SD card binding information stored in the secure storage partition of the security chip of the dongle and SD card binding information stored in a specified position of the SD card, determines whether they are identical, if yes, execute Step 204, if no, execute Step 204'.

Step 204, the security chip of the dongle claims itself as a dongle device according to information in the partition information table, claims itself as a first U disk device and/or compact disk at the same time.

Step 204 specifically is that the security chip of the dongle claims itself as dongle device according to the information in the partition information table in the secure storage partition and claims itself as a first U disk device and/or compact disk at the same time, sends a first logic partition identification corresponding to the first U disk device, a second logic partition identification corresponding to the second U disk device and a third logic partition identification corresponding to the compact disk to the operating system.

In Embodiment 2, the information in the partition information table is partition information of SD card, which includes: a logic partition identification corresponding to a partition type, a partition size and a start position.

In Embodiment 2, the partition information of the partition information table specifically includes: a first logic partition identification corresponding to the first U disk partition, capacity of the first U disk partition, a start position of the first U disk partition, algorithm and key which are corresponding to the first U disk partition;

a second logic partition identification corresponding to the second U disk partition, capacity, PIN code and a start position of the second U disk partition, algorithm and key which are corresponding to the second U disk partition;

capacity of the encrypted partition, a start position, PIN code and the algorithm and key which are corresponding to the encrypted partition; and/or a third logic identification corresponding to the compact disk, capacity and a start position of the compact disk.

In Embodiment 2, the partition type and the partition size and the start position is non-sensitive information.

PIN code, algorithm and key are sensitive information.

Step 205, the security chip of the dongle waits for receiving an instruction.

Step 206, the security chip of the dongle receives an instruction, when the received instruction is a instruction for standard dongle, execute Step 207; when the received instruction is an instruction for reading compact disk sent from the operating system, execute Step 208; when the received instruction is a read instruction for a first U disk partition sent from the operating system, execute Step 209; when the received instruction is a write instruction for the first U disk partition sent from the operating system, execute Step 210; when the received instruction is a PIN verifying instruction for the second U disk partition sent from an upper layer, execute Step 211, when the instruction is a read instruction for the second U disk, execute Step 213; when the received instruction is a write instruction for the second U disk, execute Step 214: when the received instruction is an instruction for clearing secure status of the second U disk partition, execute Step 215; when the received instruction is a PIN code setting instruction for the second U disk partition, execute Step 216; when the received instruction is a PIN code verifying instruction for the encrypted partition sent from the upper layer, execute Step 217; when the received instruction is a read instruction for the encrypted partition sent from the upper layer, execute Step 219; when the received instruction is a write instruction for the encrypted partition sent from the upper layer, execute Step 221; when the received instruction is an instruction for clearing security status of the encrypted partition, execute Step 223; when the received instruction is a PIN code setting instruction for the encrypted partition sent from the upper layer, execute Step 224.

In Embodiment 2, for example, operating system can be Windows, Linux, etc.; and
the upper layer can be applications run on the operating system.

Step 207, the security chip of the dongle performs operation of the instruction for a standard dongle.

Step 208, the security chip of the dongle reads data from the compact disk according to the read instruction, returns a response of the read instruction to the operating system, then goes back to Step 205.

Specifically, the security chip of the dongle reads data from the compact disk partition according to an address and length in the read instruction, generates a response of the read instruction according to the read data, and returns the response of the read instruction, then goes back to Step 205.

For example, the read instruction for the compact disk partition is: 55 53 42 43 a0 39 6f 07 00 02 00 00 80 01 0a 28 00 00 00 40 20 00 00 01 00 00 00, in which the address for reading is 00 00 40 20, the length for reading is 00 01, the fourteenth byte 01, represents that the partition on which operation is performed is the compact disk corresponding to the third logic identification 01, the fifteenth byte 28 represents that the type of the instruction sent from the operating system is a read instruction, i.e., the operation is an operation for reading.

Step 209, the security chip of the dongle reads cipher text of the data to be read from the first U disk according to the read instruction for reading the first U disk partition, decrypts the cipher text according to the algorithm and key which are corresponding to the first U disk partition in the partition information table to obtain plaintext of the data to be read, sends a response of the read instruction for the first U disk partition to the operating system, and goes back to Step 205.

For example, the read instruction for the first U disk partition is:
55 53 42 43 a0 39 6f 07 00 02 00 00 80 00 0a 28 00 00 00 40 20 00 00 01 00 00 00, in which 00 00 40 20 is the address for reading, 00 01 is the length for reading, the fourteenth byte 00 represents that the partition on which operation is performed is the first U disk partition corresponding to the first logic partition identification 00, the sixteenth byte 28 represents that the type is the read instruction sent from the operating system, i.e., the operation is an operation for reading.

Step 210, the security chip of the dongle obtains plain text of data to be written according to the write instruction for the first U disk partition, encrypts the plain text according to the algorithm and key which are corresponding to the first U disk partition in the partition information table to obtain cipher text and writes the cipher text to the first U disk partition, returns a response of the writing instruction for the first U disk partition to the operating system, and goes back to Step 205.

For example, the write instruction for the first U disk partition is: 55 53 42 43 a0 39 6f 070002 2a 00 00 00 40 20 00 00 01 00 00 00 42 65 69 6a 69 6e 672055 6e 76 65 72 69 73 69 74 79 20 6f 66 20 50 6f 73 74 73 20 26 20 54 65, in which 00 00 40 20 is the address for writing, 00 01 is the length for writing, the fourteenth byte 00 represents that the partition on which operation is performed is the first U disk partition corresponding to the first logic partition identification 00, the sixteenth byte of OpCode of instruction head is 20, which represents that the instruction is write instruction sent from the operating system, i.e., the operation is an operation for writing;
in the partition information table, the algorithm corresponding to the first U disk partition is AES algorithm, the key corresponding to the first U disk partition is: 01 02 03 04 05 06 07 08 01 02 03 04 05 06 07 08.

Step 211, the security chip of the dongle verifies a PIN code, determines whether PIN code verifying is successful, if yes, execute Step 212, if no, report an error, then goes back to Step 205.

For example, the PIN code verifying instruction for the second U disk partition is 55 53 42 43 a0 39 6f07 00 02 00 00 80 02 0a fe 03 00 00 40 20 00 00 06 00 00 00 01 02 03 04 05 06, in which the PIN code to be verified is 01 02 03 04 05 06; the sixteenth byte of OpCode of instruction head is fe, which represents that the instruction is sent from the upper layer, the seventeenth byte is SubOpCode 03, which represents that the instruction is the PIN code verifying instruction for the second U disk partition for verifying the PIN code of the second U disk partition.

Specifically, in Step 211, the security chip of the dongle determines whether the PIN code in the PIN code verifying instruction for the second U disk partition is identical to the PIN code of the second U disk partition in the partition information table, if yes, execute Step 212, if no, report an error, then goes back to Step 205.

Step 212, the security chip of the dongle claims itself as the second U disk device and sets the permission limit of the second U disk partition to be that reading and writing is permitted, then goes back to Step 205.

Specifically, in Step 212, the security chip of the dongle claims itself as the first U disk, the dongle device and the second U disk at the same time, sets the permission limit of the second U disk as reading and writing is permitted, and goes back to Step 205.

Step 213, the security chip of the dongle reads cipher text of the data to be read from the second U disk partition according to the read instruction for the second U disk, decrypts the read cipher text according to the algorithm and the key which are corresponding to the second U disk partition in the partition information table to obtain plain text of the data to be read, returns a response of the read instruction to the operating system, and goes back to Step 205.

The read instruction for the second U disk is: 55 53 42 43 a0 39 6f 07 00 02 00 00 80 02 0a 28 00 00 00 40 20 00 00 01 00, in which the address of the data to be read is 00 00 40 20 and the length of the data to be read is 00 01; the fourteenth byte, i.e. 02, in the read instruction represents that operation is performed on the second disk partition corresponding to the third logic partition identification 02, the sixteenth byte of OpCode 8 represents that the instruction is read instruction from the operating system, the operation is an operation for reading.

Step 214, the security chip of the dongle obtains plain text of the data to be written according to the write instruction, encrypts the plain text of the data to be written according to the algorithm and the key which are corresponding to the second U disk partition in the partition information table so as to obtain cipher text, writes the cipher text into the second U disk partition, returns a response of the write instruction to the operating system, and goes back to Step 205.

Step 215, the security chip of the dongle claims to the system that the second U disk is removed and returns a response of the instruction for clearing secure status of the second U disk partition to the upper layer, and goes back to Step 205.

Step 216, the security chip of the dongle modifies the PIN code of the second U disk partition in the partition information table to be a new PIN code of the second U disk partition in the PIN code setting instruction for the second U disk partition and returns a response of the PIN code setting instruction for the second U disk partition, and goes back to Step 205.

Step 217, the security chip of the dongle verifies the PIN code, determines whether PIN code is successful, if yes, execute Step 218, if no, report an error, and goes back to Step 205.

Step 217 specifically is that the security chip of the dongle determines whether the PIN code in the PIN verifying instruction for the encrypted partition is identical to the PIN code of the encrypted partition in the partition information table, if yes, executes Step 218, if no, report an error, goes back to Step 205.

Step 218, the security chip of the dongle sets the flag of permission limit of writing and reading of the encrypted partition, and goes back to Step 205.

Step 219, the security chip of the dongle determines whether a flag of permission limit of writing and reading of the encrypted partition is set, if yes, execute Step 220, if no, report an error, goes back to Step 205.

Step 220, the security chip of the dongle reads cipher text of the data to be read from the encrypted partition according to the read instruction, decrypts the read cipher text according to key and algorithm corresponding to the encrypted partition in the partition information table to obtain plain text of the data to be read, returns a response of the read instruction back to the upper layer, and goes back to Step 205.

Step 220 specifically includes that the security chip of the dongle reads cipher text of the data to be read, decrypts the read cipher text according to key and algorithm corresponding to the encrypted partition in the partition information table to obtain plain text of the data to be read, organizes a response of the read instruction according to the plain text of the data to be read, returns the response of the read instruction back to the upper layer, and goes back to Step 205.

For example, the read instruction for the encrypted partition is: 55 53 42 43 a0 39 6f 07 00 02 fe 01 00 00 40 20 00 00 01 00 00 00; the address for reading is: 00 00 40 20, the length is 00 01, the sixteenth byte of the instruction head of the read instruction is OpCode fe, which represents that the instruction is from the upper layer; the seventeenth byte 01 represents that the instruction is read instruction for reading the encrypted partition.

Step 221, the security chip of the dongle determines whether the flag of permission limit of writing and reading of the encrypted partition is set, if yes, execute Step 222, if no, report an error, then goes back to Step 205.

Step 222, the security chip of the dongle obtains plain text of the data to be written according to the write instruction for encrypted partition, encrypts the plain text of the data to be written according to the algorithm and key in the partition information table to obtain the cipher text, write the cipher text into the encrypted partition, returns a response of the write instruction to the upper layer, and goes back to Step 205.

For example, the write instruction for the encrypted partition is: 55 53 42 43 a0 39 6f 07 00 02 fe 02 00 00 40 20 00 00 01 00 00 00; the address for writing is: 00 00 40 20, the length is: 00 01, the sixteenth byte of the instruction head of the instruction is OpCode fe, which represents that the instruction is from the upper layer; the seventeenth byte is SubOpCode 02, which represents that the instruction is read instruction for the encrypted partition.

Step 223, The security chip of the dongle resets the flag of permission limit of writing and reading of the encrypted partition, returns a response of the instruction for clearing security status of the encrypted partition, and goes back to Step 205.

Step 224, the security chip of the dongle modifies the PIN code of the encrypted partition in the partition information table to a new PIN code of the encrypted partition in the PIN code setting instruction for the encrypted partition, and goes back to Step 205.

Step 204', the security chip of the dongle claims itself as a massive storage device and a dongle device.

In Embodiment 2, Step 204' can be that the security chip of the dongle claims itself as dongle device.

Step 205', the security chip of the dongle waits for receiving an instruction, when an instruction for standard dongle sent from the operating system is received, execute Step 206', when a partitioning instruction sent from the upper layer is received, executes Step 207'.

Step 206', the security chip of the dongle performs operation of an instruction for standard dongle, and goes back to Step 205'.

Step 207', the security chip of the dongle performs partitioning operation on the SD card according to a partitioning information table in the partitioning instruction, generates SD card binding information according to non-sensitive information in the partitioning information table, writes the SD card binding information into a specified position of the SD card, writes the partitioning information table in a secure storage partition of the security chip, returns a response of partitioning instruction, then executes Step 204.

In Embodiment 2, Step 207' specifically is that the security chip of the dongle performs hash operation on partition type, partition size and start position in the partitioning information table to obtain a hash value, takes the hash value as SD card binding information and stores the SD card binding information in a specified partition of the SD card, returns a response of partitioning instruction, execute Step 204.

In Embodiment 2, the content of the partition information table includes: a logic partition identification corresponding to a partition, a partition size corresponding to partition type, and a start position.

In embodiment 2, the partition information of the partition information table specifically includes: a first logic partition identification corresponding to the first U disk partition, capacity of the first U disk partition, a start position of the first U disk partition, algorithm and key which are corresponding to the first U disk partition;
  a second logic partition identification corresponding to the second U disk partition, capacity, PIN code and a start position of the second U disk partition, algorithm and key which are corresponding to the second U disk partition;
  capacity of the encrypted partition, a start position, PIN code and the algorithm and key which are corresponding to the encrypted partition; and/or
  a third logic identification corresponding to the compact disk, the capacity and the start position of the compact disk.

In Embodiment 2, the partition type and partition size and start position are non-sensitive information.

PIN code, algorithm and key are sensitive information.

In Embodiment 2, when the partitioning instruction sent from the upper layer is received, executing Step 207' specifically includes:

when a portioning instruction sent from the upper layer is received, execute Step 207'-1, when an instruction for binding SD card sent from the upper layer is received, execute Step 207'-2 to Step 207'-4.

Step 207'-1, security chip of the dongle performs partitioning operation on the SD card according to the partition information table in the partitioning instruction, writes the partition information table in a secure storage partition of the security chip, returns a response of the partitioning instruction to the upper layer, and executes Step 204.

Step 207'-2, the security chip of the dongle generates a random number.

Step 207'-3, the security chip of the dongle generates SD card binding information according to the random number and product sequence number of the dongle via HASH algorithm.

Step 207'-4, the security chip of the dongle writes the SD card binding information into the secure storage partition of the security chip of the dongle and a specified section of the SD card, returns a response of the SD card binding information to the upper layer, go back to Step 205'.

In Embodiment 2, Step 207'-2 to Step 207'-4 can be realized by the following steps:

Step 207'a, the security chip of the dongle parses the instruction for binding SD card sent from the upper layer to obtain a binding time;

Step 208'a, the security chip of the dongle joints the binding time and the product sequence number of the dongle and perform hash operation on the jointed data so as to obtain a hash value and takes the hash value as SD card binding information;

Step 209'a, the security chip of the dongle writes the SD card binding information into the secure storage partition of the security chip of the dongle and a specified section of the SD card respectively, returns a response of the instruction for binding SD card, and goes back to Step 205'.

Embodiment 3

Figure 4:
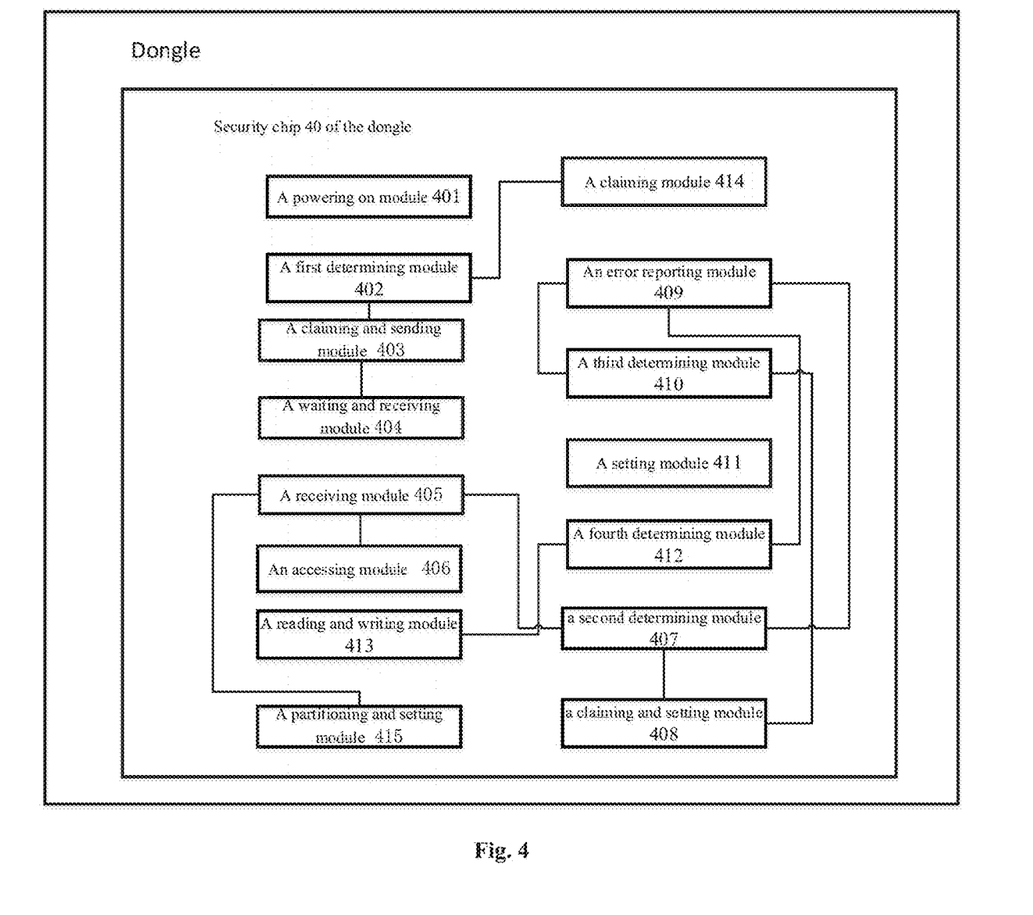
FIG. 4 is a block diagram of a dongle of Embodiment 3 of the present invention.

Embodiment 3 provides a dongle. As shown in FIG. 4, the dongle includes a security chip 40 of the dongle, the security chip 40 of the dongle includes:

a powering on module 401 configured for powering on;

a first determining module 402 configured to determine whether a SD card in a card slot of the dongle is a legitimate SD card, if yes, trigger a claiming and sending module 403, if no, trigger a claiming module 414;

the claiming and sending module 403 configured to claim that the security chip of the dongle is a first U disk device and a dongle device, send a first logic partition identification corresponding to the first U disk partition and a second logic partition identification corresponding to a second U disk partition to an operating system and trigger a waiting and receiving module 404;

the waiting and receiving module 404 configured to wait for receiving an instruction;

a receiving module 405 configured to receive an instruction;

an accessing module 406 configured to, when the instruction received by the receiving module 405 is an instruction for accessing the first U disk partition/the second U disk partition sent from the operating system, access the first U disk partition/the second U disk partition according to the first logic partition identification/the second logic partition identification in the instruction for accessing the first U disk partition/the second U disk partition, algorithm and key corresponding to the first U disk partition/the second U disk partition in a partition information table, and trigger the waiting and receiving module 404;

a second determining module 407 configured to, when the instruction received by the receiving module 405 is an instruction for verifying PIN code of the second U disk partition sent from an upper layer, determine whether a PIN code in the instruction for verifying PIN code of the second U disk partition is identical to the PIN code corresponding to the second U disk partition in the partition information table, if yes, trigger a claiming and setting module 408, if no, trigger an error reporting module 409;

the claiming and setting module 408 configured to claim the security chip as a second U disk device, set a permission limit of the second U disk partition to be that reading and writing is permitted, and trigger the waiting and receiving module 404;

the error reporting module 409 configured to report an error and trigger the waiting and receiving module 404;

a third determining module 410 configured to determine whether a PIN code in the instruction for verifying a PIN code of encrypted partition is identical to the PIN code corresponding to the encrypted partition in the partition information table, if yes, trigger a setting module 408, if no, trigger the error reporting module 409;

the setting module 411 configured to set a permission limit of the encrypted partition to be that reading and writing is permitted, and trigger the waiting and receiving module 404;

a fourth determining module 412 configured to determine whether permission limit of the encrypted partition is that reading and writing is permitted, if yes, trigger the reading and writing module 413, if no, trigger the error reporting module 409;

a reading and writing module 413 configured to perform reading or writing operation on the data of the encrypted partition according to a read/write instruction for the encrypted partition and the algorithm and the key corresponding to the encrypted partition in the partition information table, and trigger the waiting and receiving module 404;

the claiming module 414 configured to claim the security chip of the dongle as a massive storage device and a dongle device;

a partitioning and setting module 415 configured to, when the instruction received by the receiving module 405 is a partitioning instruction, partition the SD card into a first U disk partition, a second U disk partition and an encrypted partition according to partition type, partition size and start position in a partition information table in the partitioning instruction, store the partition information table into a secure storage partition of the security chip of the dongle, set the SD card to be legitimate, and trigger the claiming and sending module.

The claiming and sending module 403 specifically is configured to claim the security chip of the dongle as a compact disk, a first U disk device and a dongle device, send a first logic partition identification corresponding to the first U disk device, a second logic partition identification corresponding to the second U disk device and a third logic partition identification corresponding to the compact disk to the operating system, and trigger the waiting and receiving module 404.

The reading and writing module 413 is further configured to, when the instruction received by the receiving module 405 is a read/write instruction for compact disk sent from the operating system, perform reading or writing operation on the compact disk according to the third logic partition identification in the read/write instruction for compact disk, and trigger the waiting and receiving module 404.

The accessing module 406 is specifically configured to, when the instruction for accessing the first U disk partition/the second U disk partition is a read instruction sent from the operating system, read data from the first U disk partition/the second U disk partition according to an address and length in the read instruction, decrypt the read data by using the algorithm and the key corresponding to the first U disk partition/the second U disk partition in the partition information table to obtain decrypted data, send the decrypted data to the operating system, and trigger the waiting and receiving module 404.

The accessing module 406 is specifically configured to, when the instruction for accessing the first U disk partition/the second U disk partition is a write instruction sent from the operating system, encrypt the data to be written in the write instruction by using the algorithm and the key corresponding to the first U disk partition/the second U disk partition in the partition information table to obtain encrypted data, write the encrypted data into the first U disk partition/the second U disk partition according to a write address in the writing instruction, trigger the waiting and receiving module 404.

The first determining module 402 specifically is configured to generate SD card verifying information according to partition type, partition size and start position in a partition information table stored into a secure storage partition of the security chip of the dongle, read binding information of the SD card and determine whether the SD card verifying information is identical to the SD card binding information stored in the SD card, if yes, trigger the claiming and sending module 403, if no, trigger the claiming module 414.

That the partitioning and setting module 415 configured to set the SD card to be legitimate specifically is that the partitioning and setting module configured to generate SD card binding information according to the partition type, the partition size and the start position in the partition information table and store the binding information into the SD card, and trigger the waiting and receiving module 404.

The security chip of the dongle further includes a partitioning and storing module and a binding and setting module.

The partitioning and storing module 405 is configured to, when the instruction received by the receiving module is partitioning instruction sent from an upper layer, partition the SD card into a first U disk partition, a second U disk partition and an encrypted partition according to partition type, partition size and a start position in the partition information table in the partitioning instruction, store the partition information table into a secure storage partition of the security chip of the dongle, and trigger the waiting and receiving module.

The binding and setting module 405 specifically is configured to, when the received instruction is an instruction for binding SD card sent from the upper layer, generate a random number, generate SD card binding information according to the random number and a product sequence number of the dongle, store the SD card binding information into the secure storage partition of the security chip of the dongle and the SD card respectively, setting the SD card to be legitimate, trigger the claiming and sending module 403.

The security chip of the dongle further includes a partitioning and storing module and a binding and setting module.

The partitioning and storing module is configured to, when the instruction received by the receiving module 405 is a partitioning instruction sent from the upper layer, partition the SD card into a first U disk partition, a second U disk partition and an encrypted partition according to partition type, partition size and a start position in the partition information table in the partitioning instruction, store the partition information table into the secure storage partition of the security chip of the dongle, and trigger the waiting and receiving module.

The binding and setting module is specifically configured to, when the instruction received by the receiving module 405 is an SD card binding instruction sent from the upper layer, generate SD card binding information according to binding time and the product sequence number of the dongle in the instruction for binding SD card, store the SD card binding information into a secure storage partition of the security chip and the SD card respectively, set the SD card to be legitimate, and trigger the claiming and sending module.

The first determining module 402 is specifically configured to read the SD card binding information stored in secure storage partition of the security chip of the dongle and the SD card binding information stored in the SD card, determine whether they are identical, if yes, trigger the claiming and sending module 403, if no, trigger the claiming module 414.

The security chip of the dongle further includes: a fifth determining module configured to determine whether a SD card is in a slot of the dongle, if yes, trigger the first determining module 402, if no, trigger the claiming module 414.

The claiming module 414 further is configured to claim the dongle as a standard dongle device when the determining result of the fifth determining module is no.

The security chip of the dongle further includes an operating module.

The operating module specifically is configured to, when the instruction received by the receiving module 405 is an instruction for dongle, perform operation of the instruction for dongle.

The error reporting module 409 is further configured to report error when the instruction received by the receiving module 405 is not an instruction for dongle.

The claiming and setting module 408 further is configured to, when the instruction received by the receiving module 405 is an instruction for clearing security status of the second U disk partition sent from the upper layer, claim that the second U disk is removed already and set reading and writing permission limit of the second U disk partition to be that reading and writing is not permitted, and trigger the waiting and receiving module 404.

The setting module 411 is further configured to, when the instruction received by the receiving module 405 is an instruction for clearing a PIN code of the encrypted partition sent from the upper layer, set reading and writing permission limit of the encrypted partition to be that reading and writing is not permitted, trigger the waiting and receiving module 404.

The embodiments of the invention have been described in details as above. Embodiments are together with the accompanying drawings. Apparently, the disclosures are only a few specific embodiments of the application, but the application is not limited to them, and any changes that can be thought of by those skilled in the art should fall into the scope of protection of the application. The scope of protection of the application is defined by the appended claims.

The invention claimed is:

1. A method for realizing a dongle that includes an SD card slot, wherein said method comprises the following steps:
   1) The dongle is powered on;
   2) Determining, by a security chip of the dongle, whether an SD card in the SD card slot of the dongle is a legitimate SD card, if yes, executing Step 3, if no, executing Step 3';
   3) claiming, by the security chip of the dongle, itself as a first U disk device and a dongle device, and sending a first logic partition identification corresponding to a first U disk partition and a second logic partition identification corresponding to a second U disk partition to an operating system;
   4) waiting for, by the security chip of the dongle, receiving instructions;
   5) receiving, by the security chip of the dongle, an instruction, when the instruction received is instructions for accessing the first U disk partition/the second U disk partition sent from the operating system, executing Step A1; when the instruction received is instructions for verifying a PIN code of the second U disk partition sent from an upper layer, executing Step B1; when the instruction received is instructions for verifying a PIN code of an encrypted partition sent from the upper layer, executing Step C1; when the instruction received is a read/write instruction for the encrypted partition sent from the upper layer, executing Step D1;
   A1) accessing, by the security chip of the dongle, the first U disk partition/the second U disk partition according to the first logic partition identification/the second logic partition identification in the instruction for accessing the first U disk partition/the second U disk partition, as well as an algorithm and a key corresponding to the first U disk partition or the second U disk partition in a partition information table, then going back to Step 4;
   B1) determining, by the security chip of the dongle, whether a PIN code in the instruction for verifying a PIN code of the second U disk partition is identical to the PIN code corresponding to the second U disk partition in the partition information table, if yes, executing Step B2, if no, reporting an error and going back to Step 4;
   B2) claiming, by the security chip of the dongle, itself as a second U disk device, setting a permission limit of the second U disk partition to be that reading and writing is permitted, then going back to Step 4;
   C1) determining, by the security chip of the dongle, whether a PIN code in the instruction for verifying a PIN code of the encrypted partition is identical to the PIN code corresponding to the encrypted partition in the partition information table, if yes, executing Step C2, if no, reporting an error, then going back to Step 4;
   C2) setting, by the security chip of the dongle, a permission limit of the encrypted partition to be that reading/writing is permitted, then going back to Step 4;
   D1) determining, by the security chip of the dongle, whether a permission limit of the encrypted partition is that reading/writing is permitted, if yes, executing Step D2, if no, reporting an error, then going back to Step 4;
   D2) performing, by the security chip of the dongle, reading or writing operation on data in the encrypted partition according to the read/write instruction for the encrypted partition and an algorithm and a key corresponding to the encrypted partition in the partition information table, then going back to Step 4;
   3') claiming, by the security chip of the dongle, itself as a massive storage device and a dongle device;
   4') waiting for, by the security chip of the dongle, receiving instructions;
   5') receiving, by the security chip of the dongle, instructions, and when the received instruction is a partitioning instruction, executing Step A1';
   A1') partitioning, by the security chip of the dongle, the SD card into the first U disk partition, the second U disk partition and the encrypted partition according to a partition type, a partition size and a start position in the partition information table in the partitioning instruction; storing the partition information table into a secure storage partition of the security chip of the dongle; and setting the SD card to be legitimate, then executing Step 3.

2. The method of claim 1, wherein Step 3 specifically comprises: claiming, by the security chip of the dongle, itself as a compact disk, a first U disk device and a dongle device; sending a first logic partition identification corresponding to the first U disk device, a second logic partition identification corresponding to the second U disk device, and a third logic partition identification corresponding to the compact disk to the operating system;
   Step 5 further comprises: when the instruction received is a read/write instruction for compact disk sent from the operating system, executing Step E1;
   E1) performing, by the security chip of the dongle, reading or writing operation on the compact disk according to the third logic partition identification in the read/write instruction for compact disk.

3. The method of claim 1, wherein the instruction for accessing the first U disk partition/the second U disk partition sent from the operating system is a read instruction sent from the operating system; Step A1 specifically comprises: reading, by the security chip of the dongle, data from the first U disk partition/the second U disk partition according to an address and length in the read instruction; decrypting the read data by using the algorithm and the key corresponding to the first U disk partition or the second U disk partition in the partition information table, so as to obtain decrypted data; and sending the decrypted data to the operating system; then going back to Step 4.

4. The method of claim 1, wherein the instruction for accessing the first U disk partition/the second U disk partition sent from the operating system is a write instruction sent from the operating system, Step A1 specifically comprises: encrypting, by the security chip of the dongle, the data to be written in the write instruction by using the algorithm and the key corresponding to the first U disk partition or the second U disk partition in the partition information table, so as to obtain encrypted data; writing the encrypted data into the first U disk partition/the second U disk partition according to a write address in the writing instruction, then going back to Step 4.

5. The method of claim 1, wherein Step 2 specifically comprises: generating, by the security chip of the dongle, SD card verifying information according to a partition type, a partition size and a start position in the partition information table stored in a secure storage partition of the security chip of the dongle; reading binding information of the SD card; and determining whether the SD card verifying information is identical to the SD card binding information stored in the SD card, if yes, executing Step 3; if no, executing Step 3';

setting the SD card to be legitimate in Step A1' specifically comprises: generating, by the security chip of the dongle, SD card binding information according to the partition type, the partition size and the start position in the partition information table; and storing the binding information into the SD card.

6. The method of claim 1, wherein

Step 4' specifically comprises: waiting for, by the security chip of the dongle, receiving an instruction; when the instruction received is a partitioning instruction sent from an upper layer, executing Step B1'; when the instruction received is an instruction for binding the SD card sent from the upper layer, executing Step C1';

B1') partitioning, by the security chip of the dongle, the SD card into the first U disk partition, the second U disk partition, and an encrypted partition according to a partition type, a partition size and a start position in the partition information table in the partitioning instruction; storing the partition information table into a secure storage partition of the security chip of the dongle; then executing Step 4';

C1') generating, by the security chip of the dongle, a random number; generating SD card binding information according to the random number and a product sequence number of the dongle; storing the SD card binding information into a secure storage partition of the security chip of the dongle and the SD card, respectively; setting the SD card to be legitimate, then executing Step 3.

7. The method of claim 1, wherein

Step 4' specifically comprises: waiting for, by the security chip of the dongle, receiving an instruction, when the instruction received is a partitioning instruction sent from the upper layer, executing Step B1'; when the instruction received is an SD card binding instruction sent from the upper layer, executing Step c1';

B1') partitioning, by the security chip of the dongle, the SD card into the first U disk partition, the second U disk partition, and an encrypted partition according to a partition type, a partition size and a start position in the partition information table in the partitioning instruction; storing the partition information table into a secure storage partition of the security chip of the dongle, then executing Step 4';

c1') generating, by the security chip of the dongle, SD card binding information according to binding time and a product sequence number of the dongle in the instruction for binding SD card; storing the SD card binding information into a secure storage partition of the security chip and the SD card, respectively; setting the SD card to be legitimate, then executing Step 3.

8. The method of claim 6, wherein Step 2 specifically comprises: reading, by the security chip of the dongle, the SD card binding information stored in its secure storage partition and the SD card binding information stored in the SD card; determining whether they are identical to each other, if yes, executes Step 3, if no, executing Step 3'.

9. The method of claim 1, wherein before Step 2, the method further comprises: determining, by the security chip of the dongle, whether an SD card exists in the SD card slot of the dongle, if yes, executing Step 2, if no, claiming, by the security chip of the dongle, itself as a standard dongle device and waiting for receiving an instruction, if the instruction is an instruction for dongle, performing operation of the instruction for dongle, if the instruction is not an instruction for dongle, then reporting an error.

10. The method of claim 1, wherein, Step 5 further comprises: when the instruction received is an instruction for clearing a security status of the second U disk partition sent from the upper layer, executing Step F1, F1) claiming, by the security chip of the dongle, to the operating system that the second U disk has been removed already; and setting a reading and writing permission limit of the second U disk partition to be that reading and writing is not permitted, then going back to Step 4;

when the instruction received is an instruction for clearing a PIN code of the encrypted partition sent from the upper layer, then executing Step G1, G1) setting, by the security chip of the dongle, a reading and writing permission limit of the encrypted partition to be that reading and writing is not permitted, then going back to Step 4.

11. A dongle, wherein said dongle comprises a security chip of the dongle and an SD card slot, the security chip of the dongle comprises:

a means for powering on configured for powering on;

a first means for determining whether an SD card in the SD card slot of the dongle is a legitimate SD card, if yes, trigger a means for claiming and sending, if no, trigger a means for claiming;

the means for claiming and sending where is configured to claim that the security chip of the dongle is a first U disk device and a dongle device, send a first logic partition identification corresponding to a first U disk partition and a second logic partition identification corresponding to a second U disk partition to an operating system, and trigger a means for waiting and receiving;

the means for waiting and receiving where is configured to wait for receiving instructions;

a means for receiving instructions;

a means for accessing, when the instruction received by the means for receiving is an instruction for accessing the first U disk partition/the second U disk partition sent from the operating system, the first U disk partition/the second U disk partition according to the first logic partition identification/the second logic partition identification in the instruction for accessing the first U disk partition/the second U disk partition, an algorithm and a key corresponding to the first U disk partition or the second U disk partition in a partition information table, and trigger the means for waiting and receiving;

a second means for determining, when the instruction received by the means for receiving is an instruction for verifying a PIN code of the second U disk partition sent from an upper layer, whether a PIN code in the instruction for verifying PIN code of the second U disk partition is identical to the PIN code corresponding to the second U disk partition in the partition information table, if yes, trigger a means for claiming and setting, if no, trigger a means for reporting any error;

the means for claiming and setting where is configured to claim the security chip as a second U disk device, set a permission limit of the second U disk partition to be that reading and writing is permitted, and trigger the means for waiting and receiving;

the means for reporting any error which is configured to report an error, and trigger the means for waiting and receiving;

a third means for determining whether a PIN code in the instruction for verifying a PIN code of an encrypted partition is identical to the PIN code corresponding to the encrypted partition in the partition information table, if yes, trigger a means for setting, if no, trigger the means for reporting any error;

the means for setting which is configured to set a permission limit of the encrypted partition to be that reading/writing is permitted, and trigger the means for waiting and receiving;

a fourth means for determining whether a permission limit of the encrypted partition is that reading/writing is permitted, if yes, trigger the means for reading and writing, if no, trigger the means for reporting any error;

a means for reading and writing to perform reading and/or writing operation on data of the encrypted partition according to a read/write instruction for the encrypted partition and an algorithm and a key corresponding to the encrypted partition in the partition information table, and trigger the means for waiting and receiving;

the means for claiming which is configured to claim the security chip of the dongle as a massive storage device and a dongle device;

a means for partitioning and setting which is configured to, when the instruction received by the means for receiving is a partitioning instruction, partition the SD card into the first U disk partition, the second U disk partition and the encrypted partition according to a partition type, a partition size and a start position in the partition information table in the partitioning instruction, store the partition information table into a secure storage partition of the security chip of the dongle, set the SD card to be legitimate, and trigger the means for claiming and sending.

12. The dongle of claim 11, wherein the means for claiming and sending specifically is configured to claim the security chip of the dongle as a compact disk, a first U disk device and a dongle device; send a first logic partition identification corresponding to the first U disk device, a second logic partition identification corresponding to the second U disk device and a third logic partition identification corresponding to the compact disk to the operating system; and trigger the means for waiting and receiving;

the means for reading and writing is further configured to, when the instruction received by the means for receiving is a read/write instruction for compact disk sent from the operating system, perform reading and/or writing operation on the compact disk according to the third logic partition identification in the read/write instruction for compact disk, and trigger the means for waiting and receiving.

13. The dongle of claim 11, wherein the means for accessing is specifically configured to, when the instruction for accessing the first U disk partition/the second U disk partition is a read instruction sent from the operating system, read data from the first U disk partition/the second U disk partition according to an address and length in the read instruction, decrypt the read data by using the algorithm and the key corresponding to the first U disk partition or the second U disk partition in the partition information table so as to obtain decrypted data, send the decrypted data to the operating system, and trigger the means for waiting and receiving.

14. The dongle of claim 11, wherein the means for accessing is specifically configured to, when the instruction for accessing the first U disk partition/the second U disk partition is a write instruction sent from the operating system, encrypt data to be written in the write instruction by using the algorithm and the key corresponding to the first U disk partition or the second U disk partition in the partition information table so as to obtain encrypted data, write the encrypted data into the first U disk partition/the second U disk partition according to a write address in the writing instruction, and trigger the means for waiting and receiving.

15. The dongle of claim 11, wherein the first means for determining specifically is configured to generate SD card verifying information according to a partition type, a partition size and a start position in the partition information table stored into a secure storage partition of the security chip of the dongle, read binding information of the SD card and determine whether the SD card verifying information is identical to the SD card binding information stored in the SD card, if yes, trigger the means for claiming and sending, if no, trigger the means for claiming;

that the means for partitioning and setting is configured to set the SD card to be legitimate specifically is that the means for partitioning and setting is configured to generate SD card binding information according to the partition type, the partition size and the start position in the partition information table and store the binding information into the SD card, and trigger the means for waiting and receiving.

16. The dongle of claim 11, wherein the security chip of the dongle further comprises a means for partitioning and storing and a means for binding and setting;

the means for partitioning and storing is configured to, when the instruction received by the means for receiving is a partitioning instruction sent from an upper layer, partition the SD card into the first U disk partition, the second U disk partition and an encrypted partition according to a partition type, a partition size and a start position in the partition information table in the partitioning instruction, store the partition information table into a secure storage partition of the security chip of the dongle, and trigger the means for waiting and receiving;

the means for binding and setting specifically is configured to, when the instruction received is an instruction for binding SD card sent from the upper layer, generate a random number, generate SD card binding information according to the random number and a product sequence number of the dongle, store the SD card binding information into the secure storage partition of the security chip of the dongle and the SD card, respectively, set the SD card to be legitimate, and trigger the means for claiming and sending.

17. The dongle of claim 11, wherein the security chip of the dongle further comprises a means for partitioning and storing and a means for binding and setting, the means for partitioning and storing is configured to, when the instruction received is a partitioning instruction received by the means for receiving sent from the upper layer, partition the SD card into the first U disk partition, the second U disk partition and an encrypted partition according to a partition type, a partition size and a start position in the partition information table in the partitioning instruction, store the partition information table into a secure storage partition of the security chip of the dongle, and trigger the means for waiting and receiving; and the means for binding and setting is specifically configured to, when the instruction received by the means for receiving is an SD card binding instruction sent from the upper layer, generate SD card binding information according to binding time and the product sequence number of the dongle in the instruction for binding the SD card, store the SD card binding information into a secure storage partition of the security chip and the SD card, respectively, set the SD card to be legitimate, and trigger the means for claiming and sending.

18. The dongle of claim 16, wherein the first means for determining is specifically configured to read the SD card binding information stored in the secure storage partition of the security chip of the dongle and the SD card binding information stored in the SD card, determine whether they are identical to each other, if yes, trigger the means for claiming and sending, if no, trigger the means for claiming.

19. The dongle of claim 11, wherein the security chip of the dongle further comprises: a fifth means for determining whether an SD card is in the SD slot of the dongle, if yes, trigger the means for first determining, if no, trigger the means for claiming;

the means for claiming further is configured to claim the dongle as a standard dongle device, the security chip of the dongle further comprises a means for operating, the means for operating specifically is configured to, when the instruction received by the means for receiving is an instruction for dongle, perform an operation of the instruction for dongle, the means for reporting any error is further configured to report an error when the instruction received by the means for receiving is not an instruction for dongle.

20. The dongle of claim 11, wherein the means for claiming and setting further is configured to, when the instruction received is an instruction for clearing a security status of the second U disk partition sent from the upper layer, claim that the second U disk has been removed already, set a reading and writing permission limit of the second U disk partition to be that reading and writing is not permitted, and trigger the means for waiting and receiving;

the means for setting is further configured to, when the instruction received is an instruction for clearing a PIN code of the encrypted partition sent from the upper layer, set a reading and writing permission limit of the encrypted partition to be that reading and writing is not permitted, and trigger the means for waiting and receiving.

* * * * *